United States Patent [19]

Bruns et al.

[11] Patent Number: 4,705,546
[45] Date of Patent: Nov. 10, 1987

[54] FUEL COLLECTION IN SURFACE TENSION FUEL TANKS

[75] Inventors: Helmut Bruns, Kirchweyhe; Artur Freiheit, Stuhr; Arnold Kolley, Ganderkesee, all of Fed. Rep. of Germany

[73] Assignee: Erno Raunfahrttechnik GmbH, Bremen, Fed. Rep. of Germany

[21] Appl. No.: 868,266

[22] Filed: May 28, 1986

[30] Foreign Application Priority Data

Jun. 10, 1985 [DE] Fed. Rep. of Germany ....... 3520676

[51] Int. Cl.⁴ .................................................. B01D 19/00
[52] U.S. Cl. ........................................ 55/182; 55/493; 222/189
[58] Field of Search ........................ 55/159, 182, 493; 222/189

[56] References Cited

U.S. PATENT DOCUMENTS

| | | | |
|---|---|---|---|
| 797,266 | 8/1905 | Conklin | 222/189 |
| 2,504,683 | 4/1950 | Hannley | 222/189 |
| 3,854,905 | 12/1974 | Balzer et al. | 55/159 |
| 3,933,448 | 1/1976 | Di Peri | 55/159 |
| 4,595,398 | 6/1986 | Orton et al. | 55/182 |

Primary Examiner—Charles Hart
Attorney, Agent, or Firm—Ralf H. Siegemund

[57] ABSTRACT

Fuel collecting Ti container for use in conjuntion with a surface tension fuel tank of a space vehicle is constructed as a flat cylindrical-tubular element having an open end with a chamfered edge; a Ti clamping ring is mounted to the open end of the container and has a matingly chamfered internal shoulder; the clamping ring is electron beam welded to the container in an area defining a gap between an axial end of the clamping ring and an outer shoulder portion of the container tube; and a sieve covering the open end of the container is clamped in between the chamfered shoulder and the chamfered edge; the chamfers are about 20 degrees and shoulder and edge end in rounded beads.

3 Claims, 2 Drawing Figures

FUEL COLLECTION IN SURFACE TENSION FUEL TANKS

BACKGROUND OF THE INVENTION

The present invention relates to a device for the collection of fuel operating in conjunction with a surface tension fuel tank of a space vehicle and including a collecting container mde of Ti to which are connected thin fine mash metal strainers or sieves.

Space vehicles such as satellites use attitude control devices particularly thrust producing devices to which fuel is fed from a storage tank by means of a pressurized gas. It is important to avoid any inclusion of the gas and insertion into the fuel or the thrust producing device since such gas inclusion may interfere with proper operation. Bearing in mind that in outer space one cannot rely on the force of gravity the separation of gas from liquid fuel has in the past been obtained by means of a membrane made of a synthetic material. While functioning in principle it is however not possible to use such membranes if the fuel is to some extent chemically aggressive; even if the aggression is of a minor nature destruction of a very thin membrane is almost inevitable and merely a matter of time.

It has been proposed in accordance with German printed patent application No. 31 46 262 to use surface tension fuel tanks wherein the separation of the fuel moving pressurized gas from the fuel itself obtains through utilization of surface tensions. The tanks made here are made of Ti but that poses in turn a problem of the compatibility of the material, particularly if steel Ti alloys are used; they are regarded as technologically difficult. Thin fine mesh strainers or sieves for these fuel collecting containers are made of very thin steel wires. This is so because Ti wires cannot be made smaller than 40 micrometers in diameter but such small and smaller dimensions are in fact needed. Therefore these steel compounds were in the past made by explosion plating. This is a very expensive method and is really not applicable to very light compounds which is a general requirement for space vehicles.

DESCRIPTION OF THE INVENTION

It is an object of the present invention to provide a new and improved fuel collecting container for surface tension type fuel tanks, for and in spce vehicles, wherein metal sieves or strainers can be made and attached in a sufficiently low weight configuration.

In accordance with the preferred embodiment of the invention it is suggested to provide a dishlike, flat tubular container and to fasten a metal mesh strainer sieve between a chamfer of that container and a slipped on Ti clamping ring having a corresponding i.e. matching chamfer. The ring is welded to the container along the periphery by means of an electron beam, particularly to a collar or step of the tubular container under utilization of a well defined surface pressure while maintaining a well defined gap between the ring and that step.

The inventive construction avoids utilization of Ti steel alloy or composite because the sieve, mesh or strainer is clamped between the tubular container and the welded clamping ring. The welding of such a tube to the ring does not pose any problems since the materials are similar. Rather an advantage obtains owing to the gap that is being maintained because in addition a certain shrinkage occurs which provides a tension for the sieve in conjunction with the chamfer and the cooperating clamping surfaces of the ring and of the container. The chamfer and clamping surfaces of the ring and of the container should have an angle of about 20 degrees to the respective front face and should extend over about half of the wall thickness of the container. Moreover it is of advantage to provide the clamping ring as well as the tubular container with rounded bead configuration to the extent they engage the sieve material. This feature was found to avoid damage to the sieve in case vibrations occur.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding to the detailed description of the drawings FIG. 1 illustrates a fuel collecting device 1 made of Ti. This device includes a flat container 5 of short tubular configuration with open top. This tubular container is provided along the periphery with several inlet studs or nipples 2 and 3 for connection to fuel transporting tubing. The stud 2 is provided as discharged opening for the fuel while the stud 3 is connected to a conduit within a fuel line system being arranged within a fuel tank that is not illustrated otherwise. Such conduits and tube lines may include additional fuel collecting containers of the type shown in FIG. 1.

The fuel collecting container 5 is provided on its upper front side end, i.e. across the open top with a thin steel sieve strainer or mesh 4 being fastened to the container 5 in a manner that will be explained more fully below with reference to FIG. 2. Additional similar steel sieves 4 are distributed around the stud 2 in the bottom or lower part of the container 5. The fastening of these sieves to the tube structure is the same as will be explained with reference to FIG. 2.

Figure 1:
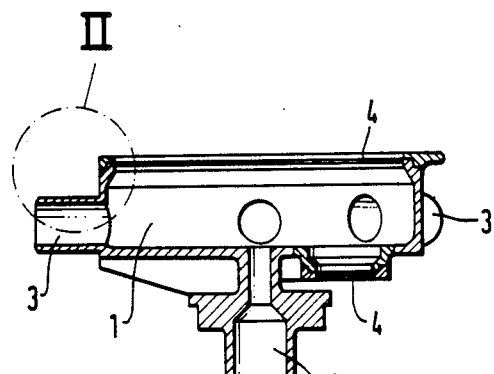
FIG. 1 is a cross section through a fuel collecting container constructed in accordance with the preferred embodiment of the present invention.
Figure 2:
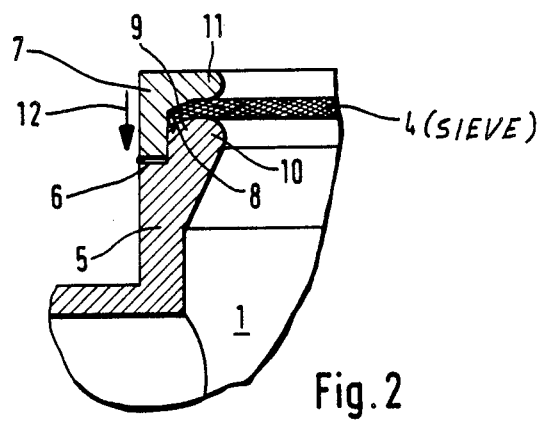
FIG. 2 illustrates an enlarged portion of the container shown in FIG. 1, the enlarged portion being indicated by II in FIG. 1.

FIG. 2 shows on an enlarged scale the fastening of the sieves such as upper sieve 4 to container 5. For this the tubular container 5 is on its outer periphery provided with a step 6 facing the axial end face of a sleeve-like clamping ring 7. Adjacent to the step 6 a chamfer or bevelled edge 8 is provided, having a width (or radial length) about equal to half the wall thickness of the tube 5. A likewise chamfered clamping shoulder 9 of ring 7 faces axially the chamfer 8. Both of these chamfers or bevels have an angle of inclination towards an axial face or front face of any of these components, amounting to about 20 degrees.

The inwardly extending upper portion of the tubular container 5 is provided with an inwardly extending rounded bead 10 radially inwardly continuing the chamfered edge 9. There is a corresponding bead 11 provided as a radial inward flange end of the sleeve or ring 7 and radially inwardly continuing shoulder 8. The sieve emerges from between these beads; the outer edges of the sieve 4 are clamped between the chamfered edge 8 and chamfered shoulder 9.

The clamping ring 7 is dimensioned so that after having been plugged onto the tubular container 5 with the sieve 4 being held clampingly in between, a definite gap exists between the axial endface of the ring 7 and the step 6. Across this gap and on the outside welding is provided whereby particularly a defined areal compression is exerted upon the clamping ring 7 and the outside portions of the elements 5 and 7 are welded together by means of electron beams. The parts 5 and 7 both are made of Ti so that welding readily obtains without any problem. Owing to the formation of a gap between the axial endface of ring 7 and the step 6 a certain shrinkage occurs amounting to a displacement as indicated by arrows 12. This way an additional tension is exerted upon the sieve 4 while the gap 6 enables the ring 7 to expand as indicated by the arrow. The round beads 10 and 11 avoid damage to the sieve on mounting which is a significant feature for ensuring a long use life of this fuel collecting container as it is used within a surface tension fuel tank.

The invention is not limited to the embodiments described above but all changes and modifications thereof, not constituting departures from the spirit and scope of the invention, are intended to be included.

We claim:

1. Fuel collecting container for use in conjunction with a surface tension fuel tank of a space vehicle; the container being made of Ti and having a fuel inlet and fuel outlet, comprising:
   a flat cylindrical-tubular element having an open end with a chamfered edge;
   a Ti clamping ring mounted to said open end of said tubular container and having a matingly chamfered internal shoulder, said clamping ring being electron beam welded to said container in an area defining a gap between an axial end of the clamping ring and an outer shoulder portion of the container tube; and
   a sieve covering the open end of the container and being clamped in between said chamfered shoulder and said chamfered edge.

2. The container as in claim 1 wherein in relation to a front end face said chamfers have an angle of about 20 degrees, said chamfers having a radial width approximately half a wall thickness of the container.

3. The container as in claim 1 said clamping ring having a radially inwardly extending flange with a rounded bead radially inwardly from said shoulder, said tube having a radially extending rounded bead facing the bead of the ring flange, the sieve emerging from the position in between said beads.

* * * * *